(12) United States Patent
Royko et al.

(10) Patent No.: US 12,497,568 B2
(45) Date of Patent: Dec. 16, 2025

(54) UPGRADING OF BIO-OIL USING AMMONIA

(71) Applicant: UNIVERSITY OF SOUTH CAROLINA, Columbia, SC (US)

(72) Inventors: Michael M. Royko, Houston, TX (US); Samuel M. Drummond, Columbia, SC (US); Jochen Lauterbach, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 216 days.

(21) Appl. No.: 18/355,444

(22) Filed: Jul. 20, 2023

(65) Prior Publication Data

US 2024/0076557 A1 Mar. 7, 2024

Related U.S. Application Data

(60) Provisional application No. 63/403,105, filed on Sep. 1, 2022.

(51) Int. Cl.
*C10G 19/02* (2006.01)

(52) U.S. Cl.
CPC ....... *C10G 19/02* (2013.01); *C10G 2300/202* (2013.01); *C10G 2300/207* (2013.01)

(58) Field of Classification Search
CPC .... C10G 2300/1011; C10G 2300/1014; C10G 1/00; C10G 2300/202; C10G 3/00; C10G 2300/1018; C10G 3/50; C10G 19/02; C10G 2300/207
See application file for complete search history.

(56) References Cited

U.S. PATENT DOCUMENTS

| | | | |
|---|---|---|---|
| 9,193,916 B2 | 11/2015 | Bar-Ziv et al. | |
| 2010/0144001 A1* | 6/2010 | Horton | C12M 45/20 435/41 |
| 2011/0219679 A1* | 9/2011 | Budarin | C10C 5/00 422/186 |

FOREIGN PATENT DOCUMENTS

| | | | | |
|---|---|---|---|---|
| CN | 112831330 A | * | 5/2021 | C05C 3/00 |
| WO | 2022/153232 | | 7/2022 | |

OTHER PUBLICATIONS

CN 112831330-A text translation (Year: 2021).*
Onsree et al. "Tehcno-economic assessment of a biomass torrefaction plant for pelletized agro-residues with flue gas as a main heat source" Energy Reports, vol. 6, Supp. 9, Dec. 2020, pp. 92-96.
Joo-Sik Kim "Production, separation and applications of phenolic-rich bio-oil-a review", Bioresour. Technol. 178 (2015) 90-98 (Abstract).
(Continued)

*Primary Examiner* — Randy Boyer
*Assistant Examiner* — Juan C Valencia
(74) *Attorney, Agent, or Firm* — DORITY & MANNING, P.A.

(57) ABSTRACT

Methods for upgrading a bio-oil are described. The methods utilize gaseous ammonia to react with one or more components of a bio-oil and thereby upgrade the bio-oil and separate the resulting mixture into organic and aqueous phases. Both the aqueous phase and the organic phase produced by the process can contain useful species such as ammonium species and an organic phase with increased energy content as compared to the bio-oil.

19 Claims, 9 Drawing Sheets

(56) References Cited

OTHER PUBLICATIONS

Drugkar et al. "Advanced separation strategies for up-gradation of bio-oil into value-added chemicals: A comprehensive review", Sep. Purif. Technol. 283 (2022) 120149.
Park et al. "Separation of switchgrass bio-oil by water/organic solvent addition and pH adjustment", Energy & Fuels. 30 (2016) 2164-2173.
Ren et al. "The effects of torrefaction on compositions of bio-oil and syngas from biomass pyrolysis by microwave heating." Bioresource Technology 135 (2013): 659-664. (Abstract).

* cited by examiner

FIG. 9 ary of the specification, including reference to the accompany-

UPGRADING OF BIO-OIL USING AMMONIA

CROSS REFERENCE TO RELATED APPLICATION

This application claims filing benefit of U.S. Provisional Patent Application Ser. No. 63/403,105 entitled "Upgrading of Bio-Oil Using Ammonia," having a filing date of Sep. 1, 2022, which is incorporated herein by reference for all purposes.

BACKGROUND

Biomass processing by torrefaction or pyrolysis is a promising way to upgrade raw biomass and improve physical properties such as grindability and storability as well as to increase the heating value of the biomass. During such processing, condensable bio-oil and carbon monoxide (CO) are produced. The CO can be utilized for syn-gas or other applications. Alternatively, a CO pollutant control technology such as catalytic oxidation can be used to produce $CO_2$. Unfortunately, bio-oil produced from torrefaction or pyrolysis constitutes an under-utilized product due to unfavorable properties and complicated processing resulting from its composition. For instance, the high acidity content of bio-oil poses issues for storage as it can corrode low alloy steel containers. The high water content also poses storage and transportation issues as well as decreasing the overall energy content of the bio-oil. Moreover, the complex nature of the organic species makes utilization as a chemical feedstock troublesome.

A variety of different processes have been developed to upgrade bio-oil and provide more valuable products, but these processes tend to require multiple steps with associated high processing costs. In addition, the separability of the organic and aqueous fractions of bio-oils can be problematic and the variability in bio-oil composition with variation in raw biomass feedstocks can also complicate processing. Some work has been done to separate bio-oil phases by adjustment of the pH via the addition of bases such as sodium hydroxide. However, these approaches also generally require multiple steps such as multiple pH adjustments and/or multiple solvent extractions.

What are needed in the art are relatively simple and inexpensive methods and systems for upgrading bio-oils so as to provide bio-oil based products with more favorable and useful characteristics. A bio-oil upgrading process that can be combined with other known formation or separation processes would also be of great benefit to the art.

SUMMARY

According to one embodiment, disclosed is a method for upgrading a bio-oil. A method can include contacting a bio-oil with a gas that includes ammonia. Upon the contact, ammonia of the gas can react with one or more components of the bio-oil. The resulting mixture can include an aqueous phase and an organic phase, the contents of which differ from the aqueous and organic phases of the bio-oil due to the presence of the reaction products in the resulting mixture. A method can also include separating the resulting aqueous phase from the organic phase.

In some embodiments, the gas fed to the process can include the ammonia in conjunction with one or more additional gas phase components, e.g., an inert carrier gas, hydrogen and nitrogen from an ammonia production process, or gas phase waste components. In one embodiment, the method can thus also serve as an ammonia scrubber and separate the ammonia from the other components of the gas fed to the bio-oil upgrading process.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to methods for upgrading a bio-oil. More specifically, disclosed methods utilize gaseous ammonia to react with one or more components of a bio-oil and thereby upgrade the bio-oil and separate the resulting upgraded materials into an aqueous and an organic phase. Beneficially, the process can be a relatively simple, single-step process in some embodiments. The aqueous phase produced by the process can contain useful species such as ammonium species that can be utilized in a variety of applications. Similarly, the organic phase produced by the process can have an increased energy content as compared to the bio-oil and as such be beneficial in any of a variety of uses. For instance, the organic phase can be utilized as an additive for fuel, e.g., transportation fuels, or can be utilized in electricity production.

Figure 1:
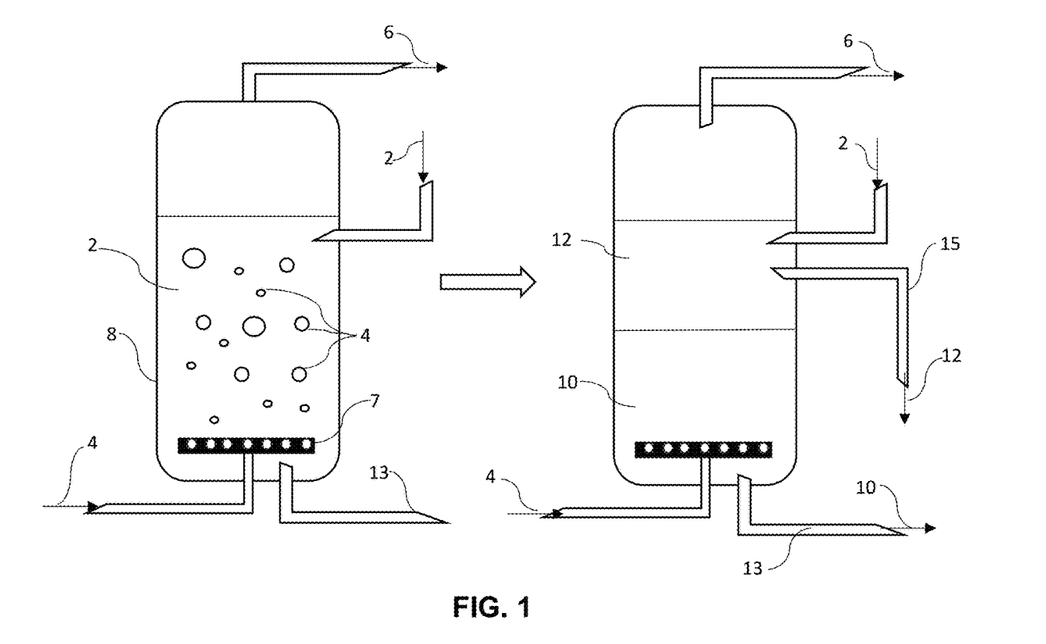
FIG. 1 schematically illustrates a bio-oil upgrading process as disclosed herein.

FIG. 1 schematically illustrates one embodiment of a bio-oil upgrading process. As indicated, upon feeding a bio-oil 2 to a suitable reactor, the bio-oil 2 can be contacted with a gas 4 that includes ammonia. For example, a system can include bubble reactor 8 including a sparger 7, so as to bubble the gas 4 through the bio-oil 2, though any suitable contact mechanism is encompassed herein. Upon contact, ammonia of the gas 4 can react with one or more components of the bio-oil 2.

As is known, bio-oils are highly acidic, with the primary acidic compounds generally including acetic and formic acids. Through interaction of the bio-oil 2 with gaseous ammonia, the ammonia can react with one or more acidic components of the bio-oil. For instance, reaction between acetic acid of the bio-oil 2 with ammonia can produce water soluble ammonium acetate, which is soluble in water of the bio-oil 2.

Figure 2:
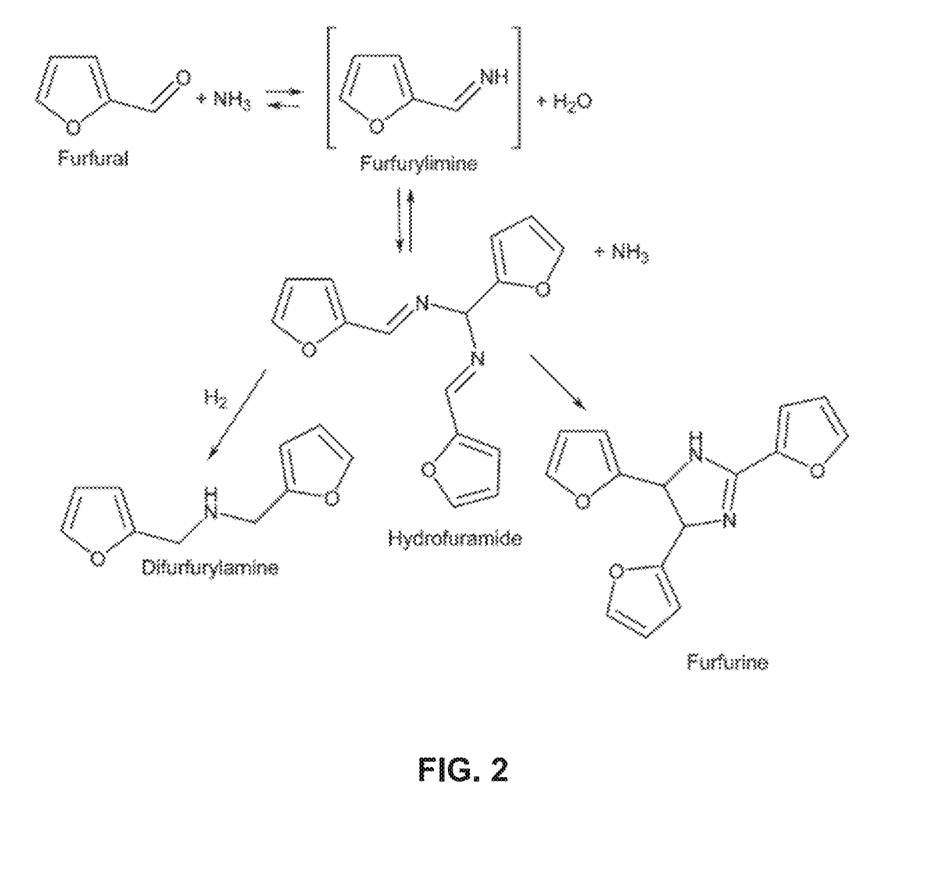
FIG. 2 illustrates exemplary chemicals as may be formed upon ammonia reaction with furfural as may be present in a bio-oil.

Reactions of the gaseous ammonia with organics of the bio-oil 2 can form compounds including nitrogen containing rings. For instance, furfural is a major component of bio-oils independent of original biomass source and is known to react with ammonia to form a variety of compounds with nitrogen substituted rings, possible examples of which are illustrated in FIG. 2.

The gaseous ammonia can also react with aldehydes and ketones of the bio-oil to produce imines via Chichibabin synthesis, which can further react with themselves or other aldehydes or ketones to produce azines such as pyridine and pyrimidine (and their derivatives) as well as non-aromatic compounds including nitrogen containing rings.

The reactions between the gaseous ammonia and organic compounds of the bio-oil can also lead to formation of larger polymer chains, which can be present in the organic phase of the resulting mixture.

Without wishing to be bound to any particular theory, it is believed that the formation of the reaction products in the resulting mixture modifies the relationship between the organic and aqueous phases of the feed bio-oil to an extent that the resulting mixture will spontaneously begin to separate, forming macroscopically distinct aqueous and organic phases.

Referring again to FIG. 1, the reaction conditions within the reactor 8 are not particularly limited. For instance, the gas 4 can be bubbled through the bio-oil at atmospheric pressure and at any suitable flow rate so as to ensure the functionality of a sparger 7, though higher or lower pressures are likewise encompassed herein. In one embodiment, the reaction temperature can be relatively low, so as to prevent evaporation of water and other aqueous compounds and carry-over of such vapors in the off-gas 6 from the reactor 8. For instance, in one embodiment, the reactor 8 can be cooled to a temperature of from about 0° C. to about 15° C., or from 0° C. to about 10° C. in some embodiments, so as to prevent evaporation and loss of water and/or other components in the off-gas 6. However, in other embodiments, higher temperatures are encompassed, for instance in embodiments in which a further separation step is incorporated to capture water and/or other components that may be carried in the off-gas flow 6.

As the gas 4 that carries gaseous ammonia contacts (e.g., is bubbled through) the bio-oil 2, and reactions occur between the ammonia and components of the bio-oil 2, the off-gas 6 will contain little or no ammonia. As the reactions proceed, and the content of the reaction products in the resulting mixture within the reactor 8 is increased, the organic and aqueous phases of the mixture can begin to separate. For instance, as the reactions proceed, the color of the reactor contents can alter and distinct macroscopic aqueous and organic phases can become evident.

In a batch-type reactor system, the reactions can be allowed to continue until ammonia break-through in the off-gas 6, i.e., the ammonia concentration in the off-gas 6 matches (or nearly matches, e.g., within about 10%) that of the feed gas 4. Of course, disclosed methods are not limited to batch-type reactor systems and in other embodiments, semi-batch or continuous processes are encompassed. In any case, upon interaction of gaseous ammonia with the bio-oil, distinct aqueous 12 and organic 10 phases can form in the reactor 8, as indicated in the right panel of FIG. 1.

The organic phase 10 produced by disclosed methods can contain a large number of individual components. For instance, in some embodiments the organic phase 10 can contain a greater number of individual components than the number of components present in the original bio-oil. However, due to separation from water and other water miscible and/or water soluble components of the reaction mixture (e.g., ammonium acetate), the organic phase 10 can provide a value added product of the process. For instance, the separated organic phase 10 can be readily ignitable and can have a greater heating value than that of ethanol, which is a common fuel additive. By way of example, a separated organic phase can have a heating value higher than that of ethanol, such as about 25 MJ/kg or higher, about 28 MJ/kg or higher, or about 29 MJ/kg or higher in some embodiments, such as from about 27 MJ/kg to about 32 MJ/kg, in some embodiments. Moreover, the separated organic phase can have a low content of unburned material, and as such can be a relatively clean burning material. Accordingly, the organic phase can be utilized as is, for instance as an energy source, e.g., in electricity production, as well as an additive for existing fuels, e.g., transportation fuels.

The aqueous phase 12 can also provide value added products. For instance, ammonium acetate formed by reaction of gaseous ammonia with acetic acid of the bio-oil can be separated from the aqueous phase according to standard separation protocols and utilized as a fertilizer, as a de-icer, as a precursor to acetamide, or as a catalyst in may liquid phase reactions, among other possible uses.

Upon formation of the distinct phases in the reaction mixture, the phases can be separated. In one embodiment, the separation of the two phases can be achieved by simply allowing gravitational settling of the reactor contents followed by sequential removal of the organic phase 10 and the aqueous phase 12, for instance via a single outlet 13. In other embodiments, the separation can be expedited, for instance by centrifugation of the reactor contents, either within the reactor 8 itself or following removal of the contents from the reactor and centrifugation in a separate centrifuge.

When considering a continuous reaction process, a reactor can include a first outlet 13 through which organic phase 10 product can be removed from the reactor 8 and a second outlet 15 through which aqueous phase 12 product can be removed from the reactor 8.

Figure 3:
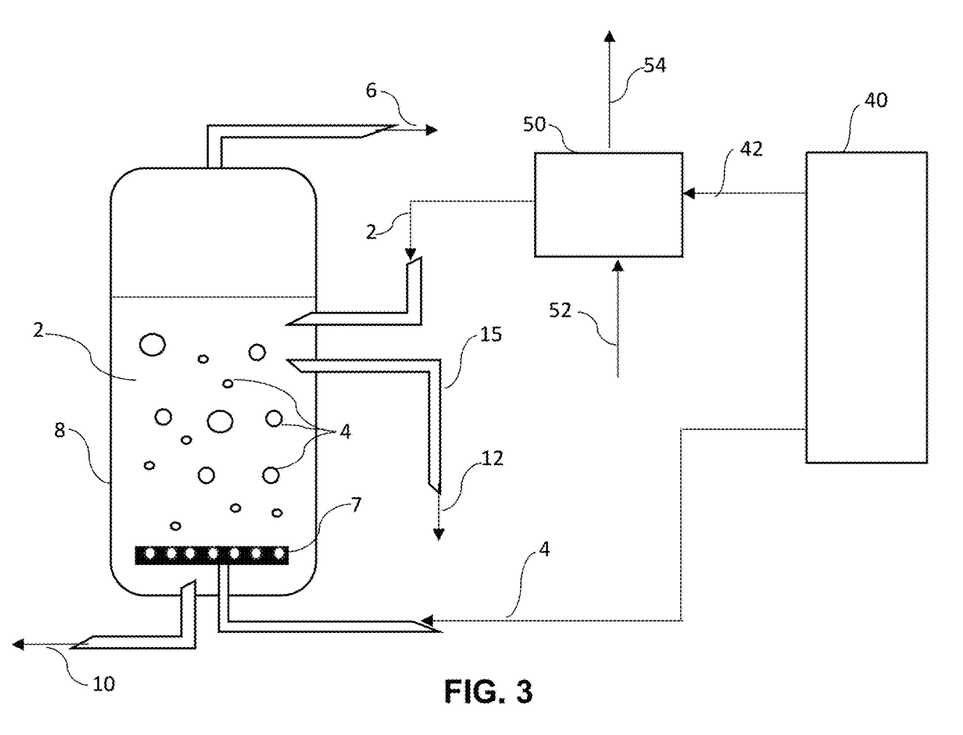
FIG. 3 schematically illustrates a combined operation including a bio-oil upgrading process.

In some embodiments, the bio-oil upgrading process can be beneficially combined with other useful processes. By way of example, methods have been described for utilization of flue gases to provide thermal energy for torrefaction of biomass (see, e.g., U.S. Pat. No. 9,193,916 and International Patent Application No. WO 2022/153232, both of which are incorporated herein by reference as well as Onsree et al. (Energy Reports, Vol. 6, Supp. 9, December 2020, pp. 92-96)). Coal-fired power plants that may provide suitable high thermal energy flue gases for torrefaction often have ammonia available for selective catalytic reduction units. As such, and as illustrated in FIG. 3, the co-location of a process as disclosed herein with a power plant 40 and a torrefaction unit 50, can be beneficial. As illustrated, a power plant 40 can supply thermal energy via a flue gas 42 to the torrefaction unit 50. At the unit 50, biomass feed 52 can be processed to produce a torrefied biomass 54 and a bio-oil that can then be fed to a bubble reactor 8. In addition, the power plant 40 can provide gaseous ammonia in a gas flow 4 that can also be sent to the bubble reactor 8. As such, the combined systems can provide power from the power plant 40 as well as upgraded biomass 54 and upgraded bio-oil products in both the aqueous phase 12 and the organic phase 10 developed in the reactor 8.

Figure 4:
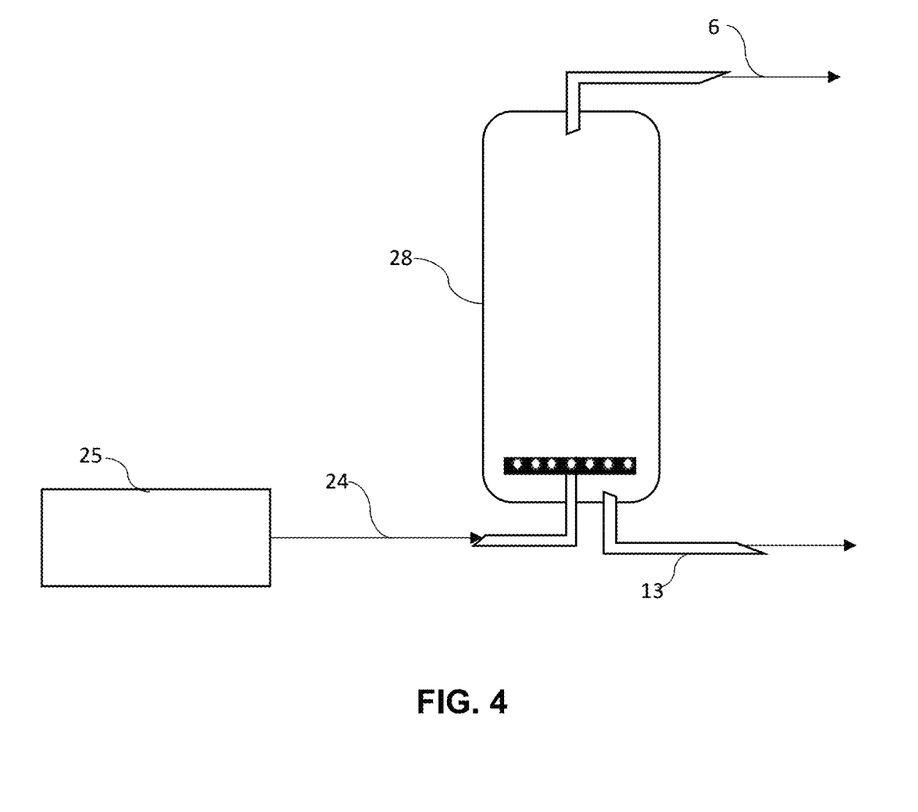
FIG. 4 schematically illustrates another combined operation including a bio-oil upgrading process.

In one embodiment, a bio-oil upgrading process as disclosed herein can provide a route for separation of ammonia from a gaseous phase. For example, as illustrated in FIG. 4, a reactor 28 can be in fluid communication with a gaseous waste stream 24, which includes ammonia in conjunction with one or more other gaseous compounds. By way of example, a reactor 28 can be utilized to remove unreacted ammonia that exits a source 25 in the effluent, representing a condition known as ammonia slip. Alternatively, a reactor 28 can be utilized to remove ammonia formed as a by-product of a source 25. In such an embodiment, the reactor 28 can effectively function as an ammonia scrubber, capable of replacing scrubbers or other ammonia capture devices currently utilized and simultaneously producing value added products from a bio-oil.

By way of example, and without limitation, a source 25 as may provide a waste stream 24 from which ammonia can be scrubbed by use of a bio-oil upgrading process as described herein can include a fertilizer production process, a coke manufacturing process, livestock management, refrigeration facilities, as well as fossil fuel combustion facilities such as those discussed previously. The fertilizer industry commonly implements wet scrubbers, condensate strippers, and recovery and recycle methods to control ammonia emissions. Coke manufacturers typically use scrubbers and capture devices to collect and treat ammonia emissions. Livestock management facilities are known to use wet scrubbers and good maintenance procedures to reduce emissions from animal manure. Facilities using ammonia as a refrigerant often use capture devices and good management practices to safeguard against potential hazards due to leaks and spills of ammonia. Emission of ammonia from fossil fuel combustion sources generally results from the implementation of post-combustion controls using ammonia or urea to decrease nitrogen oxide emissions. All of such processing could be decreased while providing value added products through combination with disclosed processes.

Common industrial scrubbing mediums that could be replaced by disclosed methods and systems include scrubbing by use of conventional acids such as sulfuric or nitric acid. As such, such combined methods can also decrease the environmental impact and costs associated with currently utilized scrubbing methodologies.

Figure 5:
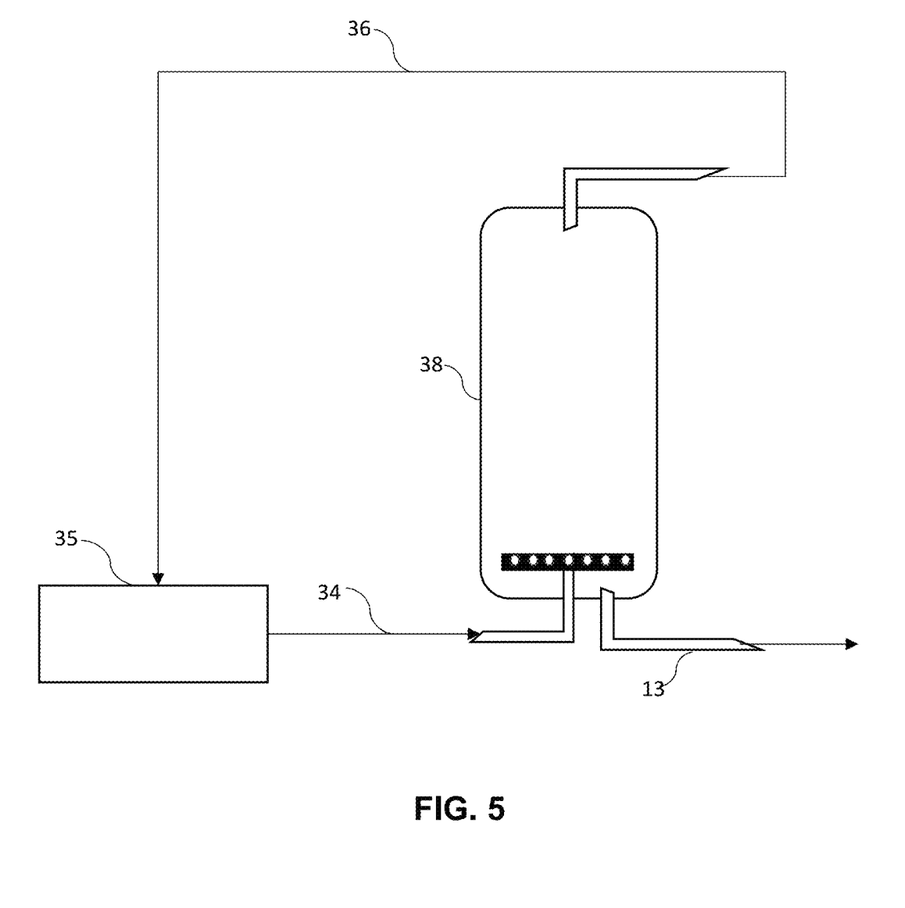
FIG. 5 schematically illustrates another combined operation including a bio-oil upgrading process.

FIG. 5 illustrates another embodiment of disclosed methods in which the gaseous feed stream 34 can be provided from an ammonia synthesis process 35 to a reactor 38. Such an embodiment can reduce the need for transportation of ammonia to a bio-oil processing facility, which can increase the flexibility of the facility with regard to location, etc. For instance, such an embodiment can be utilized at a desired bio-oil processing site that includes no available ammonia infrastructure.

Incorporation of on-site ammonia synthesis can also provide a more efficient overall process. For instance, by use of a low pressure ammonia synthesis 35 and/or utilization of hydrogen obtained via electrolysis and nitrogen obtained via pressure swing adsorption, a system can be designed that requires only water and electricity for the ammonia synthesis.

In general, the effluent 34 from an ammonia synthesis process 35 will include ammonia in conjunction with unreacted hydrogen and nitrogen. Currently, ammonia is primarily synthesized using the Haber-Bosch process which requires liquification under low temperatures or under pressure to separate the produced ammonia from the remaining hydrogen and nitrogen. Through combination with a disclosed bio-oil upgrading method, however, the reactor 38 can scrub ammonia from the ammonia synthesis effluent 34, eliminating the need for additional ammonia separation before recycling via recycle line 36 unreacted hydrogen and nitrogen back to the ammonia synthesis reactor process 35. Such an approach can enable low energy ammonia production, the elimination of cryogenic product separation, as well as the elimination of storage and transportation costs for providing the ammonia to a bio-oil upgrading process.

The present invention may be better understood with reference to the examples set forth below.

Example 1

Synthetic bio-oil was created by blending pure analogue components for each class of functional group and mixing until homogenous. A detailed composition of the synthetic bio-oil is shown below in Table 1. The composition of the bio-oil was similar to what is documented in previous literature, although with a high acid content in order to validate the process in a highly acidic environment.

TABLE 1

| Functional Group Type | Specific Chemical | Weight Percent (%) |
| --- | --- | --- |
| Water | Water | 18.8 |
| Organic Acid | Acetic Acid | 34.5 |
| Ketone | Acetone | 18.4 |
| Furans | Tetrahydrofuran | 6.3 |
| Aldehydes/Furfural | Furfural | 8.2 |
| Phenols | Phenol | 5.0 |
| Aromatics | Xylene | 1.6 |
| Non-Aromatic Rings | Cyclohexane | 7.3 |

Figure 6:
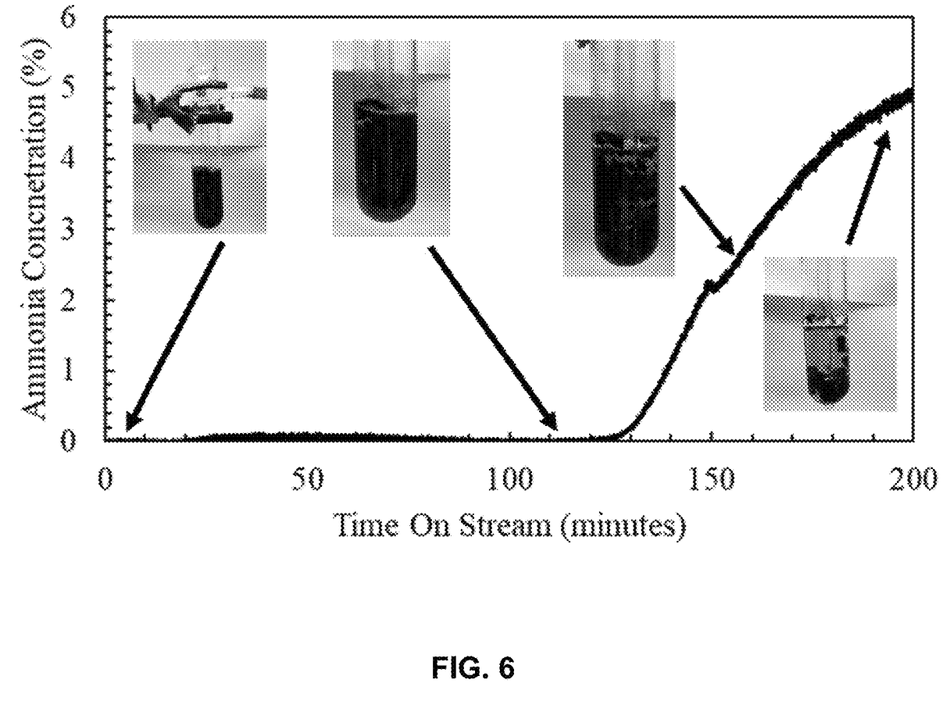
FIG. 6 illustrates one embodiment of an ammonia breakthrough curve as may take place during a bio-oil upgrading process.

Bubbling of ammonia was conducted via flowing 500 mL/min of 5% $NH_3$ diluted in argon through a Synthware® mineral oil bubbler filled with 20 mL of the synthetic bio-oil. In order to reduce the evaporation of water, the bubbler was submerged in an ice bath at approximately 0° C. Bubbling was conducted until breakthrough occurred in which the concentration of ammonia flowing through the bio-oil matched the concentration of ammonia flowing through the system without the presence of bio-oil (FIG. 6). After breakthrough occurred, the mixture was added to a centrifuge set at 6900 rpm for 5 minutes to expedite separation, although the mixture could gravitationally separate. Ammonia concentration was determined via a mass spectrometer system consisting of a Kurt J. Lesker Series 979 Atmosphere to Vacuum Transducer, MDC ULV-150 variable leaking valve, Stanford Research Systems RGA 200 and pumped with a Varian V-250 backed by an Alcatel 2021-SD. A portion of the process effluent gas was introduced to the leaking valve with a Lenox Laser 100 µm orifice plate and differentially pumped via another roughing pump.

Upon initial exposure of the bio-oil mixture to ammonia, essentially no ammonia slip occurred, as shown in FIG. 6. The point at which breakthrough began to occur at approximately 120 minutes corresponded roughly to the middle left inset image in FIG. 6, indicating that the bubbling could potentially be stopped prior to full breakthrough while still maintaining adequate separation of the two phases of the bio-oil, requiring less ammonia.

As bubbling proceeded, distinct color changes were noted as separation began to occur. Initially, the mixture started off as a homogenous black solution and briefly turned partly cloudy before a dark organic phase and a lighter aqueous phase began to develop. As ammonia slip began to occur, distinct droplets of the organic phase began to clearly develop. Near complete breakthrough, the phases completely separated, and the organic phase consisted of spherical droplets that gravitationally settled to the bottom of the experimental apparatus as seen in the two right inset images in FIG. 6.

Quantification of the ammonia consumption was accomplished by integrating the signal above the breakthrough curve and the result of this integration is shown in Table 2, below. Consistency existed from experiment to experiment with an average uptake of 8 mmol $NH_3$/mL bio-oil. Based solely on the reaction of acetic acid and ammonia, the expected uptake of 5.5 mmol of $NH_3$/mL bio-oil was much lower than what was experimentally observed. However, other mildly acidic components existed in the model bio-oil such as phenol, and the ammonia can react with other organic components. Further, the remaining ammonia would also lead to the resulting basic solution that was observed.

TABLE 2

| Experiment Number | Ammonia Uptake mmol/mL bio-oil |
|---|---|
| Experiment 1 | 8.2 |
| Experiment 2 | 8.0 |
| Experiment 3 | 8.0 |
| Average | 8.0 ± 0.1 |

Figure 7:
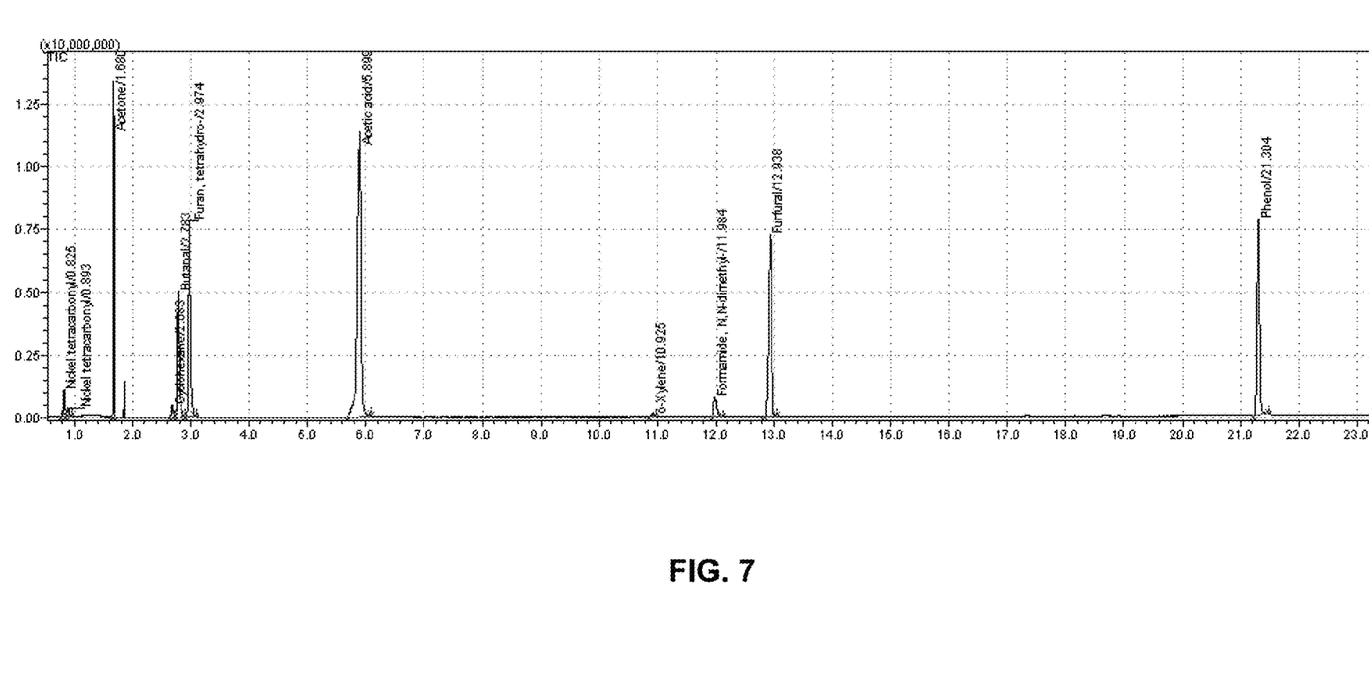
FIG. 7 provides the composition of a synthetic bio-oil utilized in the Examples section herein obtained via gas chromatography-mass spectrometry (GC-MS) analysis.
Figure 8:
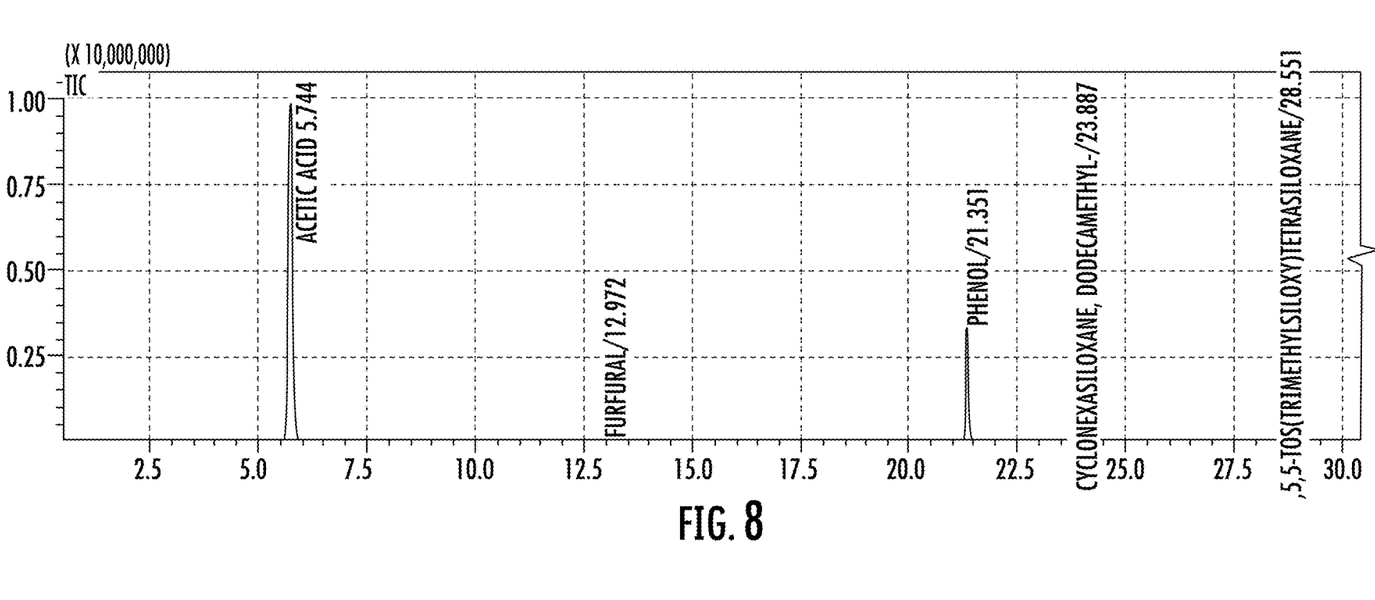
FIG. 8 provides the composition of the aqueous phase product obtained as described in the Examples section herein obtained via GC-MS analysis.
Figure 9:
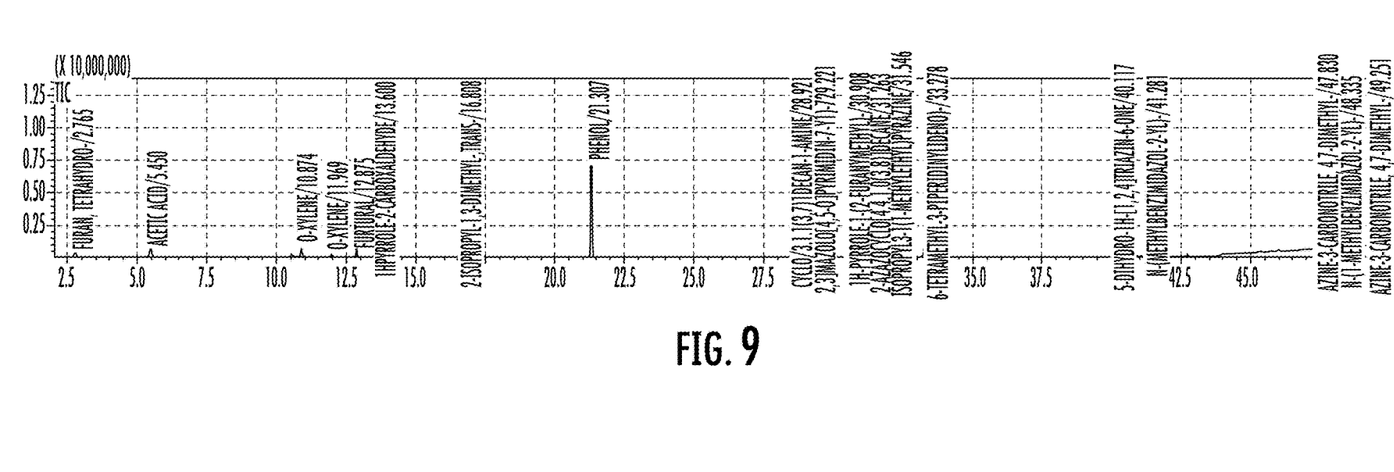
FIG. 9 provides the composition of the organic phase product obtained as described in the Examples section herein obtained via GC-MS analysis.

To determine the quality of the separation and determine where the additionally consumed ammonia had reacted, the composition of the synthetic bio-oil as well as both the organic and aqueous phases were analyzed. The compositions were determined utilizing a Shimadzu GC-2010 gas chromatography-mass spectrometry (GC-MS) equipped with a 30 m RTX-1701 column held at 40° C. for 4 minutes and then ramped at 5° C./min to 260° C. where it was held for 15 minutes. The aqueous phase was diluted 10:1 in DI water and the organic phase was similarly diluted with acetone and filtered through a 0.2 μm PVDF filter before injecting 0.3 μL of solution for analysis. FIG. 7 illustrates the resulting data of the synthetic bio-oil, FIG. 8 illustrates that of the aqueous phase, and FIG. 9 illustrates that of the organic phase.

The compositions of the aqueous phase and the organic phase are summarized in Table 3 and Table 4, respectively, below. As shown in Table 3, most of the aqueous phase was composed of ammonium acetate with some phenol and trace chemicals such as acetone and tetrahydrofuran. In contrast, the organic phase was essentially free of acetic acid/ammonium acetate as shown in Table 4. Additionally, this phase was insoluble in water but readily dissolved in acetone and ethanol and partially dissolved in cyclohexane. However, utilization of ethanol as a solvent resulted in the reaction of part of the organic phase with ethanol (replacement of —OH groups with —$OCH_2CH_3$). In general, the organic phase consisted mainly of phenol and a variety of monocyclic and polycyclic nitrogen containing species. The concentration of phenol in the organic phase was consistent run to run, however, the identity of some of the nitrogen containing species varied.

TABLE 3

| Chemical Name | Experiment 1 Area % | Experiment 2 Area % | Experiment 3 Area % | Average Area % | Using $NH_3$ from Reactor |
|---|---|---|---|---|---|
| Acetone | 0 | 0 | 0.3 | 0.1 ± 0.4 | 1.38 |
| Tetrahydrofuran | 0 | 0 | 0.6 | 0.2 ± 0.8 | 1.06 |
| Ammonium Acetate | 88.3 | 93.6 | 89.4 | 90.4 ± 3.1 | 92.65 |
| Phenol | 11.7 | 6.4 | 9.6 | 9.2 ± 2.3 | 3.88 |
| Furfural | 0 | 0 | 0 | 0 | 1.03 |

TABLE 4

| Chemical Name | Experiment 1 Area % | Experiment 2 Area % | Experiment 3 Area % | Average Area % | Using $NH_3$ from Reactor |
|---|---|---|---|---|---|
| Tetrahydrofuran | 1.8 | 1.7 | 1.2 | 1.6 ± 0.2 | 4.45 |
| Acetic acid/Ammonium Acetate | 1.1 | 0.0 | 3.2 | 1.5 ± 1.3 | 0.07 |
| Ethylbenzene | 0.4 | 0.0 | 0.0 | 0.1 ± 0.2 | 0.91 |
| o-Xylene | 2.5 | 3.2 | 3.2 | 3.0 ± 0.2 | 5.68 |
| Furfural | 1.2 | 1.0 | 2.0 | 1.4 ± 0.4 | 1.5 |
| 1H-Pyrrole-2-carboxaldehyde | 5.8 | 5.7 | 2.1 | 4.5 ± 1.7 | 0.53 |
| Aziridine, 2-isopropyl-1,3-dimethyl-, trans- | 0.6 | 0.0 | 3.3 | 1.3 ± 1.4 | 0.07 |
| 4-Piperidinone, 2,2,6,6-tetramethyl-, oxime | 0.0 | 6.9 | 0.0 | 2.3 ± 3.3 | 0 |
| Phenol | 26 | 31 | 33 | 30 ± 2.7 | 15.71 |
| Tricyclo[3.3.1.1(3,7)]decan-1-amine | 1.0 | 4.5 | 8.1 | 4.5 ± 2.9 | 3.71 |
| Acetamide, N-(3H-[1,2,3]triazolo[4,5-d]pyrimidin-7-yl)- | 0.0 | 0.9 | 1.3 | 0.7 ± 0.6 | 0.41 |
| 1H-Pyrrole, 1-(2-furanylmethyl)- | 0.7 | 0.0 | 1.0 | 0.6 ± 0.4 | 0 |
| 2-Methyl-2-azatricyclo[4.3.1.0(3,8)]decane | 1.4 | 11 | 10 | 7.6 ± 4.4 | 2.03 |
| Pyrazolo[5,1-c]1,2,4-triazine-3-carbonitrile, 4,7-dimethyl- | 27 | 17 | 13 | 19 ± 5.9 | 2.44 |
| Adamantane-1-carboxamide, N-(1-methylbenzimidazol- | 9.5 | 0.6 | 3.6 | 4.6 ± 3.7 | 13.21 |
| Other polycyclic N species | 20.4 | 15.8 | 14.8 | 17 ± 2.4 | 49.28 |

Heating values of the organic phase were determined using a Parr model 1108 bomb calorimeter that was calibrated with benzoic acid. The system was charged with 30 bar of oxygen and approximately 1 g of sample was combusted to determine the heating value. Results are shown in Table 5, below.

TABLE 5

| Property | Experiment 1 | Experiment 2 | Experiment 3 | Average |
|---|---|---|---|---|
| Higher Heating Value (MJ/kg) | 27.5 | 31.0 | 28.5 | 29.0 ± 1.51 |
| Unburned Material (%) | 0.44 | 0.55 | 0.08 | 0.36 ± 0.20 |

Example 2

An analysis was conducted utilizing an ammonia synthesis reactor as the ammonia source. Hydrogen (Airgas, UHP) and nitrogen (Airgas, UHP) flowed at 240 mL/min total (at a 50:50 ratio) through a 3/8" 316 Stainless Steel reactor tube inside of an MTI OTF-1200X furnace with an ammonia synthesis catalyst, which produced an effluent gas containing approximately 5.47% ammonia, with the balance being feed hydrogen and nitrogen. Bubbling through the bio-oil and analysis of breakthrough of ammonia was conducted as above.

A similar breakthrough curve as in Example 1 was determined, with ammonia uptake being slightly lower than that in Example 1 (approximately 7.5 mmol $NH_3$/mL compared to 8.0). Aqueous and Organic contents are shown in Table 3 and Table 4, above. As in Example 1, the phase separation occurred with ammonium acetate being the major component (92.7%) in the aqueous phase, and only in trace amounts (0.07%) in the non-aqueous phase. In fact, as shown in Table 3, similar concentrations of compounds in the aqueous phase can be seen using both $NH_3$ from a reactor and from an ammonia tank, which highlights the lack of effect of hydrogen and nitrogen in the effluent in comparison to a balance of argon. Further, as the bio-oil removed the ammonia from the gas flow, an almost pure mixture of hydrogen and nitrogen was measured, resulting in the ability recycle this gas through the reactor without the need for any further mechanism of separation; thus, resulting in a possible one-step ammonia synthesis (for ammonium acetate) and bio-fuel reactor.

While certain embodiments of the disclosed subject matter have been described using specific terms, such description is for illustrative purposes only, and it is to be understood that changes and variations may be made without departing from the spirit or scope of the subject matter.

What is claimed is:

1. A method for upgrading a bio-oil comprising:
within a reactor, contacting a bio-oil with a gas comprising ammonia, wherein upon the contact, ammonia of the gas reacts with one or more components of the bio-oil to form a resulting mixture including one or more reaction products, the resulting mixture comprising an aqueous phase and an organic phase;
separating the organic phase of the resulting mixture from the aqueous phase of the resulting mixture; and
centrifuging the resulting mixture prior to separating the organic phase from the aqueous phase.

2. The method of claim 1, the bio-oil comprising acetic acid, ammonia of the gas reacting with the acetic acid to form ammonium acetate in the aqueous phase of the resulting mixture.

3. The method of claim 2, further comprising separating the ammonium acetate from the aqueous phase.

4. The method of claim 1, the gas further comprising an inert carrier gas.

5. The method of claim 1, wherein the reactor is in fluid communication with an ammonia synthesis process, the gas comprising ammonia being provided to the reactor from the ammonia synthesis process.

6. The method of claim 5, the gas comprising ammonia further comprising hydrogen and nitrogen.

7. The method of claim 6, further comprising recycling the hydrogen and the nitrogen to the ammonia synthesis process.

8. The method of claim 1, wherein the step of contacting the bio-oil with the gas comprises bubbling the gas through the bio-oil.

9. The method of claim 8, further comprising examining an off-gas from the reactor for the presence of ammonia as the gas is bubbled through the bio-oil.

10. The method of claim 9, wherein upon determination that the off-gas includes an ammonia concentration that is within about 10% of the ammonia concentration of the gas, the contact is stopped.

11. The method of claim 1, wherein the step of contacting is carried out with the reactor cooled to a temperature of from about 0° C. to about 15° C.

12. The method of claim 1, wherein the organic phase exhibits a heating value of about 28 MJ/kg or higher.

13. The method of claim 1, wherein the reactor is in fluid communication with a biomass torrefaction or pyrolysis process, the bio-oil being supplied to the reactor from the biomass torrefaction or pyrolysis process.

14. The method of claim 1, wherein the reactor is in fluid communication with a gaseous waste stream, the gaseous waste stream comprising the ammonia.

15. A method for upgrading a bio-oil comprising:
within a reactor, contacting a bio-oil with a gas comprising ammonia, wherein upon the contact, ammonia of the gas reacts with one or more components of the bio-oil to form a resulting mixture including one or more reaction products, the resulting mixture comprising an aqueous phase and an organic phase, wherein the reactor is in fluid communication with an ammonia synthesis process, the gas comprising ammonia being provided to the reactor from the ammonia synthesis process; and
separating the organic phase of the resulting mixture from the aqueous phase of the resulting mixture.

16. The method of claim 15, the gas comprising ammonia further comprising hydrogen and nitrogen.

17. The method of claim 16, further comprising recycling the hydrogen and the nitrogen to the ammonia synthesis process.

18. A method for upgrading a bio-oil comprising:
within a reactor, contacting a bio-oil with a gas comprising ammonia, wherein upon the contact, ammonia of the gas reacts with one or more components of the bio-oil to form a resulting mixture including one or more reaction products, the resulting mixture comprising an aqueous phase and an organic phase; and
separating the organic phase of the resulting mixture from the aqueous phase of the resulting mixture; and
examining an off-gas from the reactor for the presence of ammonia as the gas is bubbled through the bio-oil.

19. The method of claim 18, wherein upon determination that the off-gas includes an ammonia concentration that is within about 10% of the ammonia concentration of the gas, the contact is stopped.

\* \* \* \* \*